Nov. 23, 1926.
J. H. BRÉGEAT
1,608,365
PREVENTING LOSS OF VOLATILE LIQUIDS
Filed Sept. 19, 1923   2 Sheets-Sheet 2
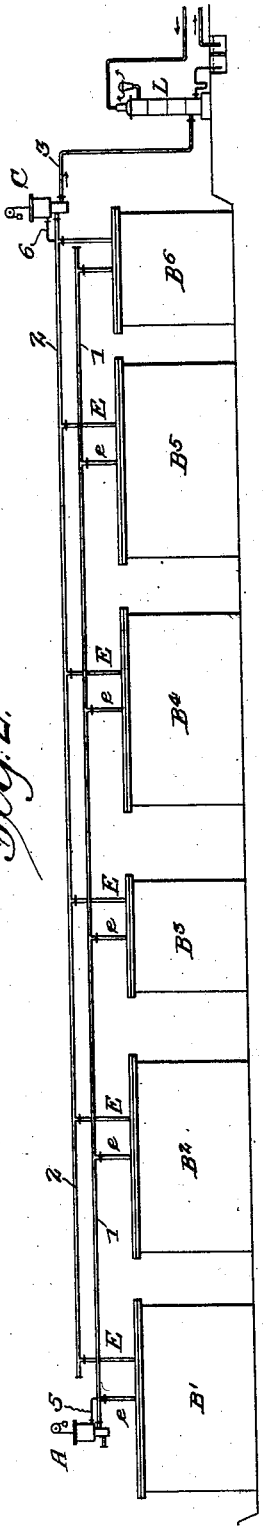
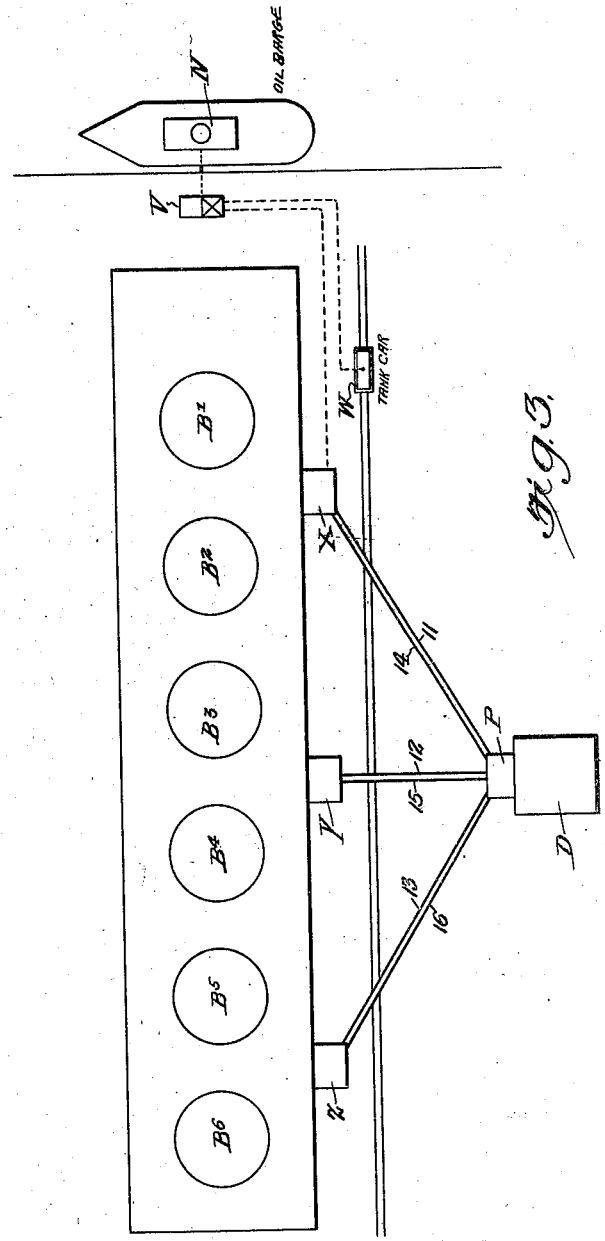
INVENTOR.
J. H. Brégeat
BY
A. B. Fort
ATTORNEY.

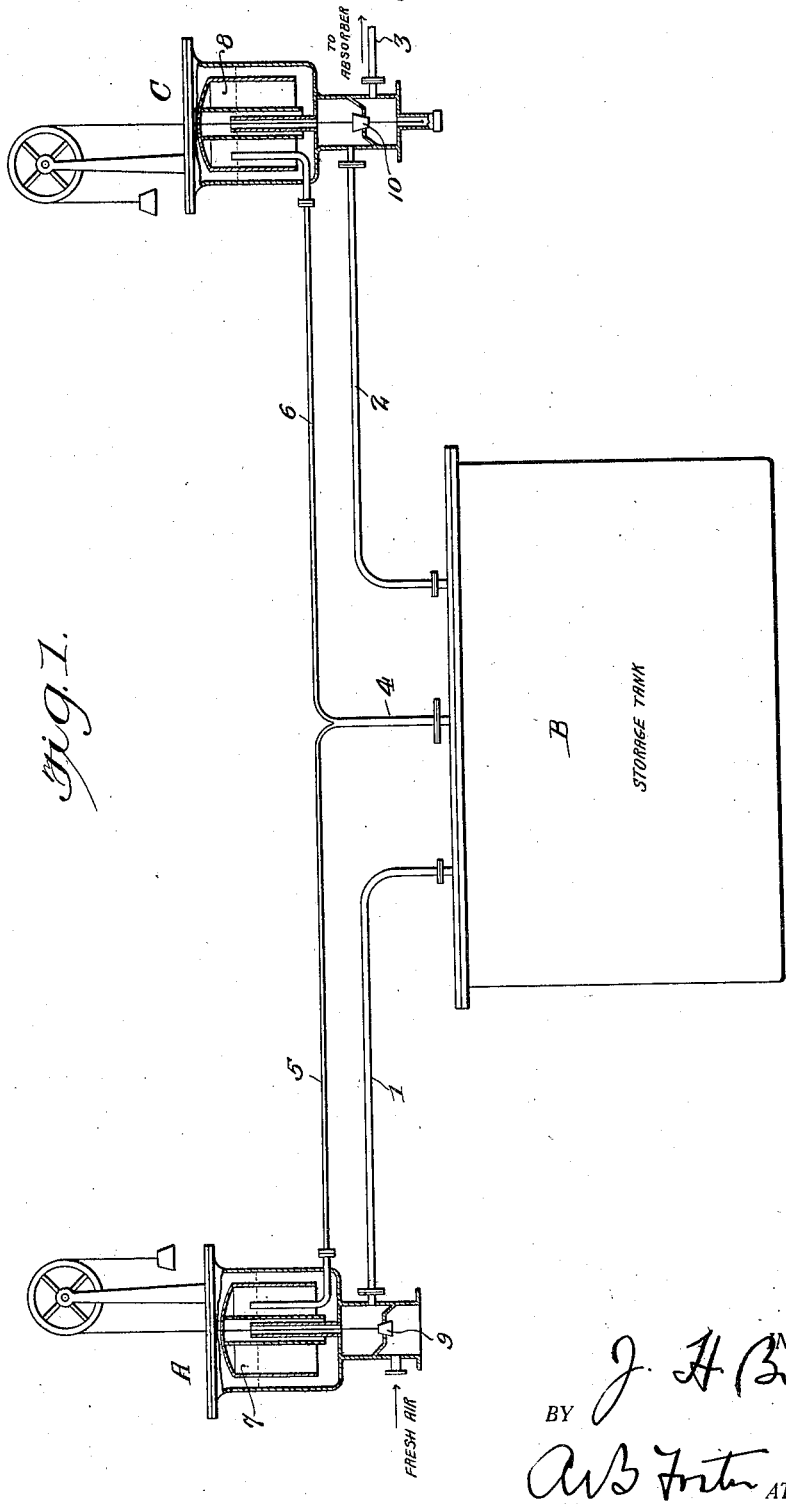

Patented Nov. 23, 1926.

1,608,365

UNITED STATES PATENT OFFICE.

JEAN HENRY BRÉGEAT, OF PARIS, FRANCE.

PREVENTING LOSS OF VOLATILE LIQUIDS.

Application filed September 19, 1923, Serial No. 663,715, and in France October 4, 1922.

The present invention relates to the recovery of volatile liquids such as solvents and fuels, when mixed with air and other gases, and heretofore lost in the course of various operations of transportation, storage and various handlings of said volatile liquids.

The volatile liquids (such as acetone, methyl, ethyl and amyl alcohols, methyl, ethyl and amyl acetates and formates, chlorine derivatives of ethane and ethylene, chloroform, benzene, benzol, toluene, solvent naphtha, petroleum ether, gasoline, ligroin, etc.) used as solvents or fuel give off in the course of various operations of transportation, storage and handling, vapors which as they are discharged into the atmosphere result in important money losses, and involve, moreover, fire and explosion hazards.

These last occur, for instance, in the following cases:

(a) Filling up tanks for storage and emptying receptacles (tank ships, tank cars, etc.,) for the transportation of the volatile products.

(b) Contraction and expansion of the atmosphere contained in tanks (either stationary for storage or movable for transportation) due to variations in the temperature of the surrounding air.

In storage plants for kerosene and gasoline for instance (which are known to contain proportions of light products, varying according to quality), these latter evaporate to such an extent that the French customs department allows for a loss of 1% in kerosene and 2% in gasoline stored (in the same manner as the alcohol department grants a certain allowance for loss to manufacturers who store alcohol).

Even assuming a certain amount of gasoline to have been stored in a tank for a sufficient time to be stripped of the light products dissolved, it is easily understood that if this gasoline is pumped into a tank or a drum, a certain proportion of this gasoline will be used to saturate the air initially contained in the tank or in the drum, and since this air is discharged outside by hydrostatic displacement (in order to make room for gasoline) it will carry with it, gasoline vapor. This loss of gasoline may be negligible in the case of very small tanks, the filling of which is rapid, but on the other hand, this loss is important when it is a question of filling tanks of large capacities containing several thousand tons, and tanks of these capacities are very often used; the loss taking place with these large tanks is estimated in average and in moderate climates at 0.3–0.5% per month.

In order to suppress or at least to reduce the losses resulting from the vaporization, there have been proposed, in addition to light and bright paints and water sprays on the walls, various means which can be classified into three following classes:—

(1) Storage of gasoline in hermetically sealed tanks; this can only be supplied to very small volumes without risk of bursting the tanks.

(2) Storage of gasoline in tanks provided with floats placed on the liquid and covering the major part of the free surface of said liquid.

(3) Application of a compensating tank arranged so as to work as a gas holder and connected, by means of suitable piping, to the tanks containing the gasoline in such a manner that the whole of the stored gasoline and the associated air and vapor of gasoline stays in a closed but expansible tank system and does not discharge vapors to the atmosphere.

None of the above mentioned means gives a complete solution of the problem to be solved, the drawbacks being well known by technicians. In the case of gasoline or similar liquids for instance, it is quite evident that the only complete, rational economical, advantageous and safe solution for avoiding the consequences of loss consists in the recovery of the vapors of gasoline (or other volatile products) by means of a suitable installation in which it would be possible to treat the air or other gas) laden with vapor as it is discharged from the tanks so as to strip from this air the vapors of gasoline (or other volatile liquids) carried over. In this manner it would be possible to avoid objectionable vacuum or pressure in the tanks while allowing, moreover, the recovery of the losses from the tanks in which the gasoline was taken to the storage plant (tank ships or tank cars).

A feature of great importance is the necessity of conducting the gases containing vapors of the volatile liquids to travel to or through the absorption apparatus as soon as the amount of pressure in the storage tank is only very slightly above atmospheric pressure.

It is accordingly of the utmost importance that the absorption system used be capable of working without producing any substantial back pressure upon the gases in the upper part of the storage tank and above the normal liquid level therein. In this way it becomes of only minor importance if the covers of the storage tank do not fit perfectly tight. I prefer the use of absorption devices and absorption processes, as covered in my U. S. Patents Nos. 1,315,700 and 1,315,701, it being understood that the column through which the mixture of gas and vapors is passed, during the absorption step, be provided interiorly with suitable filling devices, such as grids, made of wood or other suitable material, or suitable helical coils, through which the travel of the gas mixture can readily begin, even when the pressure in the tank is not more than 10 millimeters of water and in any event, I would use absorption apparatus in which the gas flow would begin long before a pressure as high as 80 millimeters of water, would exist.

The attached figures, numbered 1, 2, 3, are schematic views of collecting and recovering devices embraced in this invention.

Fig. 1 is a side elevation, partly in section, showing the operation of a simple form of the device for the collection of vapors;

Fig. 2 is a side elevation showing how it is possible to apply the device of Fig. 1 to a group of, say, six tanks, also showing an absorber.

Fig. 3 a plan view, showing an application of the device of Figs. 1 and 2, with absorption of the vapors and stripping of the enriched absorbent; and also showing connection to other devices.

Referring to Fig. 1, the apparatus may comprise—A, a regulating valve controlling the admission of fresh air from the surrounding atmosphere (or other gas from a suitable source) to the tank B (or other tanks), this regulating valve A being connected to the tank B by a pipe 1, for the admission of fresh air.

A regulating valve C for the discharge of the air (or other gas) laden with vapor, allowing, in case of pressure inside tank B, the discharge of the vapor laden air to the outside, this regulating valve C being connected, on one side, to tank B by a pipe 2, for the gaseous mixtures, and on the other side to an absorption plant (as per Patents Nos. 1,315,700 and 1,315,701, for instance, of the same inventor) by means of a piping 3. A piping connection 4 with two branches 5 and 6 allows the transmission to the bells 7 and 8 of the regulating valves A and C, of the pressure variations which take place in tank B.

The bells 7 and 8 in the regulating valves A and C are, moreover, calibrated in such a manner that when the pressure inside tank B is equal to the atmospheric pressure, the valves 9 and 10 to the regulating valves A and C are both in the closed position.

Taking up the installation shown in Fig. 2, the tops of the six tanks $B^1$ $B^2$ $B^3$ $B^4$ $B^5$ $B^6$, have each two pipe connections $e$ and $E$, and all the pipes $e$ are connected together by piping 1 connected to the space 7 in regulating valve A, while all the pipes $E$ are connected together by piping 2 connected to the space 8 in the regulating valve C.

On the other hand, the regulating valve A is also in communication with the atmosphere (or a space filled with inert gas) while the regulating valve C is also in communication with the absorption apparatus L by pipe 3.

Finally, the absorption equipment consists of a suitable scrubber L, with accessories so arranged (as per my prior patents above noted, for example) that its operation results only in an extremely small back pressure, and allows the separating of the vapors of volatile products from the air carrying them in such a manner that the air or other gas leaving the absorption equipment is stripped of vapors.

There will finally be described the installations shown in plan view on Fig. 3.

For the purpose of generalization, three absorption sets (or devices) X, Y, Z, have been figured, but it is well understood that in practice a single set properly arranged, might be sufficient. These may be like L, above referred to.

In all cases the enriched absorbent from any particular absorption set is taken by means of a pump P and piping 11—12—13, to the stripping plant D, where the products are recovered from the absorbing liquid in a liquid state, while the absorbent is regenerated and returned to the absorption sets through the pump P and the piping 14—15—16. The absorption sets are preferably installed quite near the tanks, and the pumps for handling the volatile liquids, and the stripping plant D is preferably installed as far as desired from the tanks but as close as possible to the steam generators (the above arrangement being recommended to insure complete safety).

Furthermore, a ventilation outfit is provided to exhaust the enriched air from the tank ships N, as well as from the tank cars W (after these vessels have been emptied and their liquid content taken to the storage $B^1$ $B^2$ $B^3$ $B^4$ $B^5$ $B^6$) and to discharge this enriched air into one of the absorption sets (say the set X in Fig. 3).

The ventilation outfit V can also draw air from the rooms where the liquids are to be filled into cans or drums, or where the cans or drums are stored, or where the liquids are distilled (the above three points where a loss takes place are not figured on the attached drawing) in such a manner that all the places where the loss takes place are connected with the ventilation outfit, so as to obtain the maximum recovery of the evaporation losses wherever they take place. It will be understood that the air being displaced in filling tank cars, tank ships, etc. can be likewise treated.

The operation of the collecting and recovering apparatus is as follows:

The regulating valves A and C are so set up that the regulating valve A allows 9 to open whenever the pressure in tank B drops somewhat below the atmospheric pressure (contraction in tank B) while the regulating valve C allows 10 to open whenever the pressure in tank B increases over the atmospheric pressure (expansion in tank B). In other words, the regulating valve in tank A works in the following cases:

(1) When the tank is being emptied and the volume of liquid taken has to be replaced by fresh air, if it has not already been totally or partly replaced by enriched air coming from some other connected tank, while the latter is being filled.

(2) When the enriched air, above the liquid, undergoes a contraction due to a drop in the outside temperature (night, rain, wind, cold, etc.).

The regulating valve C works in the following cases:

(1) When the tank is being filled, while the enriched air contained therein is being forced out by liquid (or this enriched air, or some of it, may also fill the empty space of another connected tank, while the latter is being emptied, before reaching the regulating valve C).

(2) When the enriched air above the liquid expands, due to the elevation of the outside temperature (sun, hot wind, etc.)

Whenever, for one of the above reasons, there is a tendency to a decrease in pressure in one or more of the tanks B, this decrease is immediately and simultaneously transmitted to all of the connected tanks and also through pipes 5 and 6 to the annular spaces 7 and 8 of regulating valves A and C.

The bell containing the space 7, goes down, thereby opening the valve 9 of the regulating valve A, and the air (or other gas) enters tank B through pipe 1 until the pressure in said tank B is in equilibrium with the atmospheric pressure.

The bell 8, acted upon by the decrease in pressure at the same time as bell 7, goes down also, but closes the valve of the regulating valve C, whereby any return of the air already treated in the absorption apparatus through pipe 2 is avoided.

In the case of an increase of the pressure in tank B, the operation of the regulating valves A and C is reversed, thereby showing the automatic discharge of the air and vapors to the absorption apparatus.

It is also worth while to note that in order to insure an actual recovery, it is necessary to avoid any solution which would consist in exhausting the air from the storage tanks (to produce a pressure below atmospheric therein) because this would result in an artificial evaporation (or increased evaporation) of the liquids.

The storage tanks in many instances can only stand a very small pressure in such a manner that it is necessary that the absorption apparatus shall maintain perfect efficiency, without offering any appreciable back pressure to the gas flow.

The only vessels where it is advisable to exhaust the enriched air by means of a fan are those which have been used in carrying the volatile liquids to the storage plant (tank ships or tank cars).

Moreover, the rooms where the liquids are being put into drums or cans, or where these are stored, and also where the liquids are distilled, should also be ventilated for the purposes of recovery, sanitary conditions, and safety, because the diffusion of the vapors in the air in these rooms results in gaseous mixtures with various concentrations of the vapors, capable of being dangerous (fire, explosion), also these gaseous mixtures result in unsanitary conditions for the workmen (poisonous fumes). It is worth while to note, on Fig. 3, the ventilation outfit V, allowing the carrying of the enriched air remaining in the tank ships N and tank cars W, after these have been emptied, this ventilation outfit being designed so as to be used for the rooms where the liquids are put in drums and cans, or where they are distilled.

While I have shown particular forms of tanks, absorbers and the like, and have shown a particular form of construction of the regulating valves, it is to be understood that the invention is not restricted to these details, but any forms of tanks and absorbers can be used and many different forms of regulating valves. It is to be understood, however, that the regulating valves must be of such a type that they operate readily under a change of pressure substantially below 80 millimeters, and I give preference to those forms which will operate under a change of pressure as low as 10 millimeters or even less. The absorption apparatus in all cases must be an apparatus not giving a back pressure of more than 80 millimeters and preferably I use absorbers which can readily be operated with a back pressure not exceeding 10 millimeters (the pressure all referring to water).

I claim:

1. A process of recovering vapors evolved in the storage of volatile liquids which comprises allowing gases from storage receptacles to leave such receptacles and pass through absorption devices, such operation commencing when said gases are under pressures not exceeding atmospheric by as much as 50 mm. of water, and continuing as long as said pressure exists.

2. An apparatus for recovery of vapors of readily volatile substances which are capable of vaporizing and the vapors mixing with gases during the handling or storage of said liquids, which comprises a sensitive regulator valve located in the gas and vapor outlet piping, such valve opening by even a very slight increase in pressure above atmospheric, and a vapor-absorption apparatus which is operative without producing a substantial back pressure in the gas and vapor mixture.

3. Apparatus as in the claim last above written, in which a plurality of liquid-containing receptacles is provided, each being connected with a unitary gas inlet regulating means operative at an extremely small pressure-difference, and each also being connected through a gas and vapor outlet regulating means operative at an extremely small pressure difference, with said vapor-absorption apparatus.

In testimony whereof I affix my signature.

JEAN HENRY BRÉGEAT.